(12) United States Patent
Hoshino

(10) Patent No.: US 6,438,092 B1
(45) Date of Patent: Aug. 20, 2002

(54) NEAR-FIELD OPTICAL RECORDING/READING APPARATUS

(75) Inventor: Takayuki Hoshino, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/461,819

(22) Filed: Dec. 16, 1999

(30) Foreign Application Priority Data

Dec. 16, 1998 (JP) .............................................. 10-357333

(51) Int. Cl.[7] .................................................. G11B 7/00

(52) U.S. Cl. ....................................................... 369/126

(58) Field of Search ............................ 369/126, 112.27, 369/13, 44.23, 13.33, 44.11, 43

(56) References Cited

U.S. PATENT DOCUMENTS 5,371,728 A 12/1994 Sakai et al.
6,147,959 A * 11/2000 Ohyama ...................... 369/126

* cited by examiner

Primary Examiner—Thang V. Tran
(74) Attorney, Agent, or Firm—Morrison & Foerster, LLP

(57) ABSTRACT

A near-field optical recording or reading apparatus has at least a tip portion of an optical fiber probe covered by a conductive layer. A recording medium is provided with another conductive layer. The conductive layer of the recording medium is connected to a high frequency power source, and this conductive layer is grounded. The electrostatic capacity between the conductive layers of the optical filer probe and recording layer is detected as a voltage value at a connector pin between the power source and a resistor; this voltage value is fed back to control the gap between the tip of the optical fiber probe and the recording medium.

16 Claims, 4 Drawing Sheets

NEAR-FIELD OPTICAL RECORDING/READING APPARATUS

This application is based on Patent Application No. 10-357333 filed in Japan, the content of which is hereby incorporated by reference.

BACKGROUND OF THE INVENTION

1. Field of the Invention

The present invention relates to a near-field optical recording/reading apparatus using a probe.

2. Description of the Related Art

In recent years various ultra high density information recording methods and reading methods have been proposed which improve the information recording density of widely used magnetic disks and optical disks. Although these methods focus on the near-field optical recording art, in these methods it is important to control the gap between the optical head and the recording medium to several tens of nanometers.

Conventional gap control methods include control methods using tunnel current, air floating methods based on the air layer lubrication principle, and share force methods using piezo elements. The tunnel current method is suitable for controlling a gap range below the nanometer order. However, the tunnel current method is unsuitable for controlling gaps on the order of several tens of nanometers such as are required in the near-field optical recording art. The air floating method is widely used in magnetic disk devices, and is considered to produce gap control of several tens of nanometers. However, a relatively large interface surface is required between the optical head and the recording medium to form the air layer. For this reason, it is difficult to ensure sufficient interface surface area in an optical head provided with a sharp-tipped probe.

The share force method is a gap control method exclusively for optical head provided with a sharp-tipped probe. However, a means is required to oscillate the probe and a plurality of optical elements are required to detect the oscillation of the probe in order to detect the gap and feedback data to drive the Z-axis piezo element, thereby disadvantageously increasing the weight of the optical heat. Moreover, the recording spot is widened by the oscillation of the probe tip, thereby disadvantageously hindering high density recording.

An object of the present invention is to provide a near-field optical recording or reading apparatus capable of detecting the gap between a probe tip and a recording medium by a simple and light-weight construction.

Another object of the present invention is to provide a near-field optical recording or reading apparatus which does not produce the side effect of widening the recording spot.

SUMMARY OF THE INVENTION

These objects are attained by the near-field optical recording apparatus or reading apparatus of the present invention comprising: a driver for supporting an optical head and maintaining a gap between a recording medium and a probe; a first conductive layer covering at least the tip portion of the probe; a detector for detecting the electrostatic capacity between the first layer and a second conductive layer provided on the recording medium; and a controller for controlling the gap between the probe and the recording medium based on the detection result of the detector.

In the present invention, the gap between the probe and the recording medium is maintained at an approximately fixed gap by a driver, e.g., a Z-axis piezo element. At this time, the electrostatic capacity between the first and the second conductive layers is maintained at a fixed value. When the gap fluctuates, the electrostatic capacity changes, and the amount of this change is detected and fed back to the driver to maintain a fixed gap.

A third conductive layer may cover the first conductive layer through an insulation layer. The third conductive layer functions as a shield layer relative to electric noise and magnetic noise, and can eliminate the influences of external noise when detecting electrostatic capacity. Alternatively, the signal of the first conductive layer may be subjected to impedance conversion and the converted signal may be input to the third conductive layer so that the first and the third conductive layers have identical electric potentials. According to this construction, detection of the electrostatic capacity between the first and the second conductive layers produces a higher accuracy, and allows accurate detection of the change even in wide gaps.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the near-field optical recording or reading apparatus of the present invention are described hereinafter with reference to the accompanying drawings.

Figure 1:
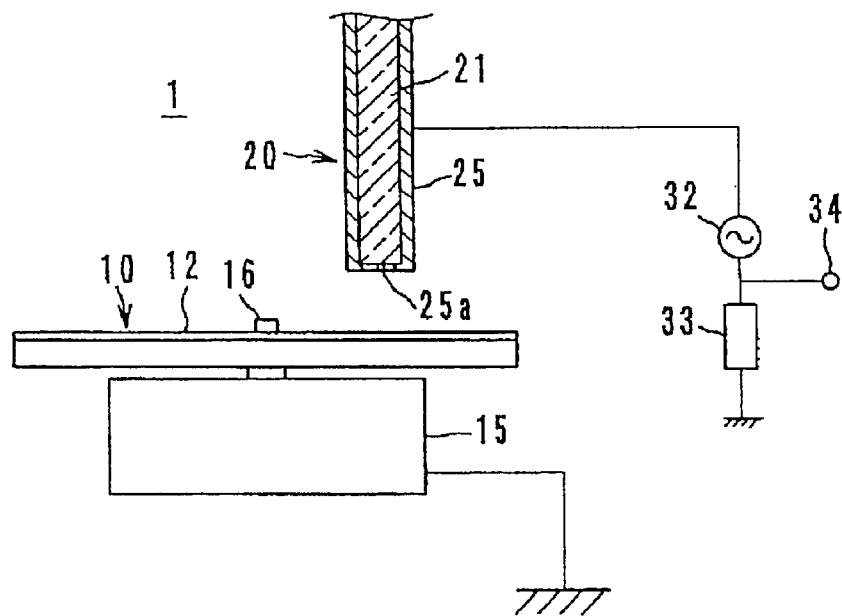
FIG. 1 briefly shows the construction of a first embodiment of the present invention.
Figure 2:
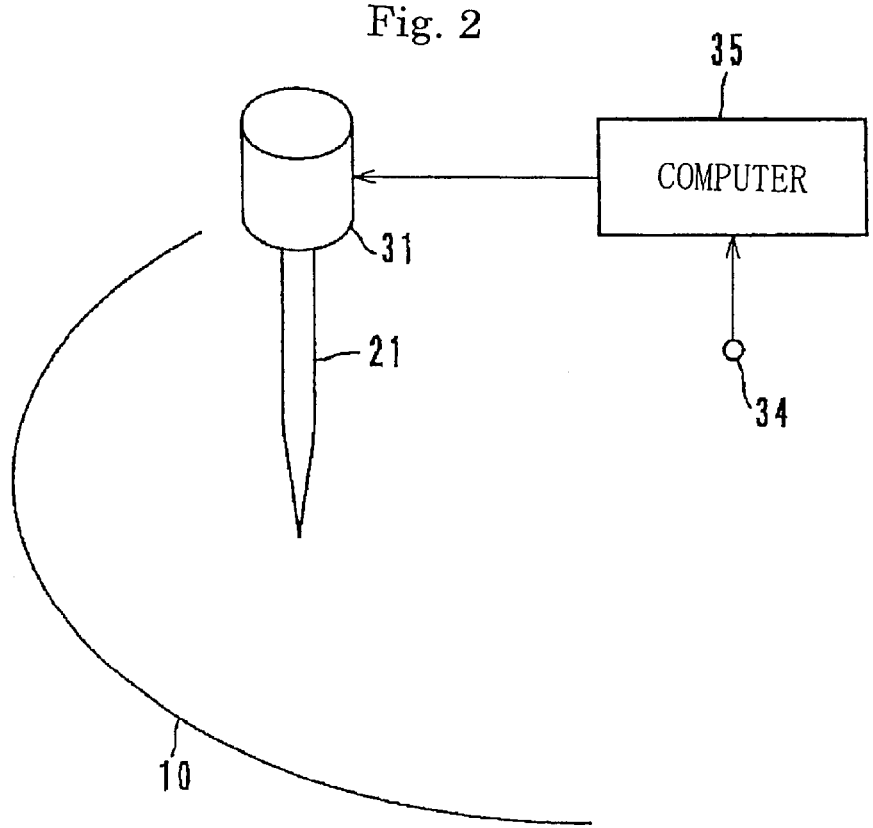
FIG. 2 is a perspective view of the drive means for maintaining the gap in the first embodiment.

First Embodiment (refer to FIGS. 1 and 2)

Figure 4:
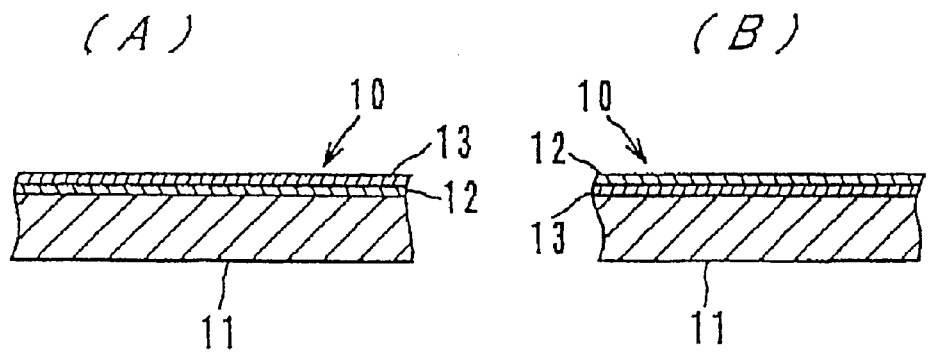
FIG. 4(A) is a cross section view of a first construction of a recording medium.
FIG. 4(B) is a cross section view of a second construction of a recording medium.

The recording or reading apparatus 1 shown in FIG. 1 comprises a recording medium 10, and an optical head 20 provided with an optical fiber probe 21. The recording medium 10 is clamped to a rotating shaft 16 of a spindle motor 15, and is driven in rotation at a prescribed speed. The recording medium 10 is provided with a substrate 11 over which is provided a conductive layer 12 and a recording layer 13, as shown in FIG. 4. FIG. 4(A) shows the recording layer 13 provided on the conductive layer 12. FIG. 4(B) shows the conductive layer 12 provided on the recording layer 13. Either form is usable. Furthermore, a protective layer may be provided on the surface. The conductive layer 12 maintains a grounded potential by grounding the case of the spindle motor 15.

The optical fiber probe 21 is supported by a Z-axis piezo element 31, as shown in FIG. 2, and at least the tip portion of the probe 21 is covered by a conductive layer 25. The conductive layer 25 has a small opening 25a approximately 100 nm in diameter formed at the tip. The optical fiber probe 21 is connected to a high frequency power source 32 and a resistor 33, and the resistor 33 is grounded. The connection point of the power source 32 and the resistor 33 is provided with an output pin 34. The output pin 34 is connected to a computer 35 for controlling the Z-axis piezo element 31 shown in FIG. 2. The conductive layer 25 and the conductive layer 12 may be formed by vacuum deposition using gold, silver, copper, aluminum and the like.

The operation of the apparatus is described below.

A light beam emitted from a light source (e.g., semiconductor laser, light-emitting diode) not shown in the drawings is guide by the probe 21, and this light beam is effused from the small opening 25a as near-field light. The effused near-field light forms a pit in the recording layer 13, or the light reflected from the pit is read. The gap between the tip of the probe 21 and the recording medium 10 is maintained at a prescribed value by controlling the Z-axis piezo element 31 via the computer 35. At this time, the gap is measured by detecting the electrostatic capacity between the conductive layers 25 and 12, and transmitting the detected value to the computer 35. The gap is maintained at a fixed value by feedback of this detection value to control the Z-axis piezo element 31.

When the gap becomes smaller between the conductive layers 25 and 12, the electrostatic capacity therebetween increases, and when the gap becomes larger, the electrostatic capacity decreases. This change in the electrostatic capacity is detected as a change in the voltage value of the output pin 34 connected between the high frequency power source 32 and the resistor 33. The method of controlling the feedback of the Z-axis piezo element 31 is identical to the feedback control of the conventional share force method.

In the first embodiment, the conductive layer 25 and its wiring are added to the optical head 20. For this reason there is virtually no weight effect on the optical head 20, and the optical head 20 can be constructed light in weight. Since the tip of the probe 21 does not oscillate to detect the gap, widening of the recording pit can be avoided, and high density recording is not hindered.

Figure 3:
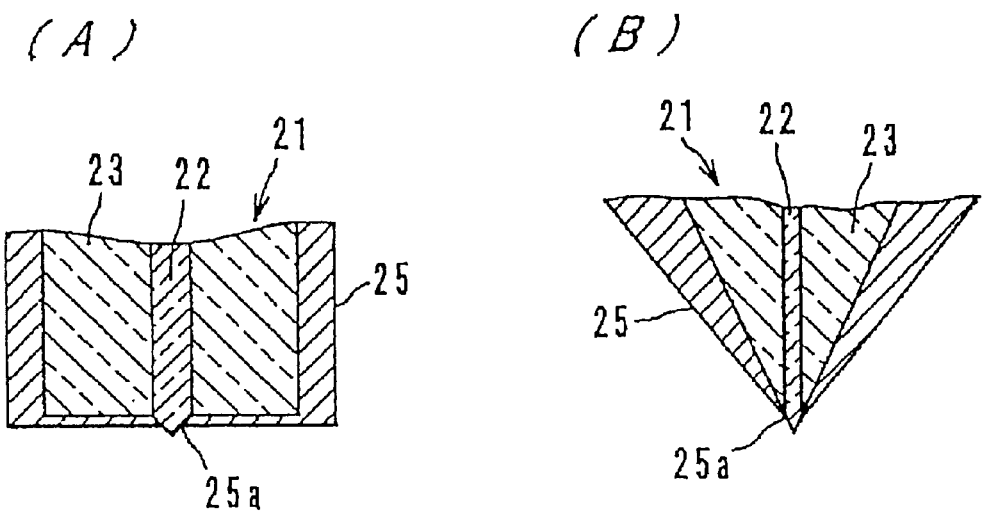
FIG. 3(A) is a cross section view of a first construction of an optical fiber probe tip area used in the first embodiment.
FIG. 3(B) is a cross section view of a second construction of an optical fiber probe tip area used in the first embodiment.

The beam spot diameter of the near-field light can be made smaller by providing the small opening 25a at the tip of the optical fiber probe 21. As shown in FIG. 3(A), if the tip of a core 22 covered by a clad 23 is sharpened and exposed from the small opening 25a, near-field light having a smaller beam spot can be effectively generated. FIG. 3(B) shows an example wherein the entire tip area of the optical fiber probe 21 is sharpened.

Either the conductive layer 12 or the recording layer 13 may be disposed on top of the recording medium 10, as shown in FIGS. 4(A) and 4(B). When the recording layer 13 is provided on top of the conductive layer 12 (refer to FIG. 4(A)), the detection of electrostatic capacity is not subject to error by the recording layer 13, if the recording layer 13 is sufficiently thin and the relative permittivity is high. When the conductive layer 12 is provided on top of the recording layer 13 (refer to FIG. 4(B)), the near-field light is transmitted through the conductive layer 12 and induces a change on the recording layer 13.

Figure 5:
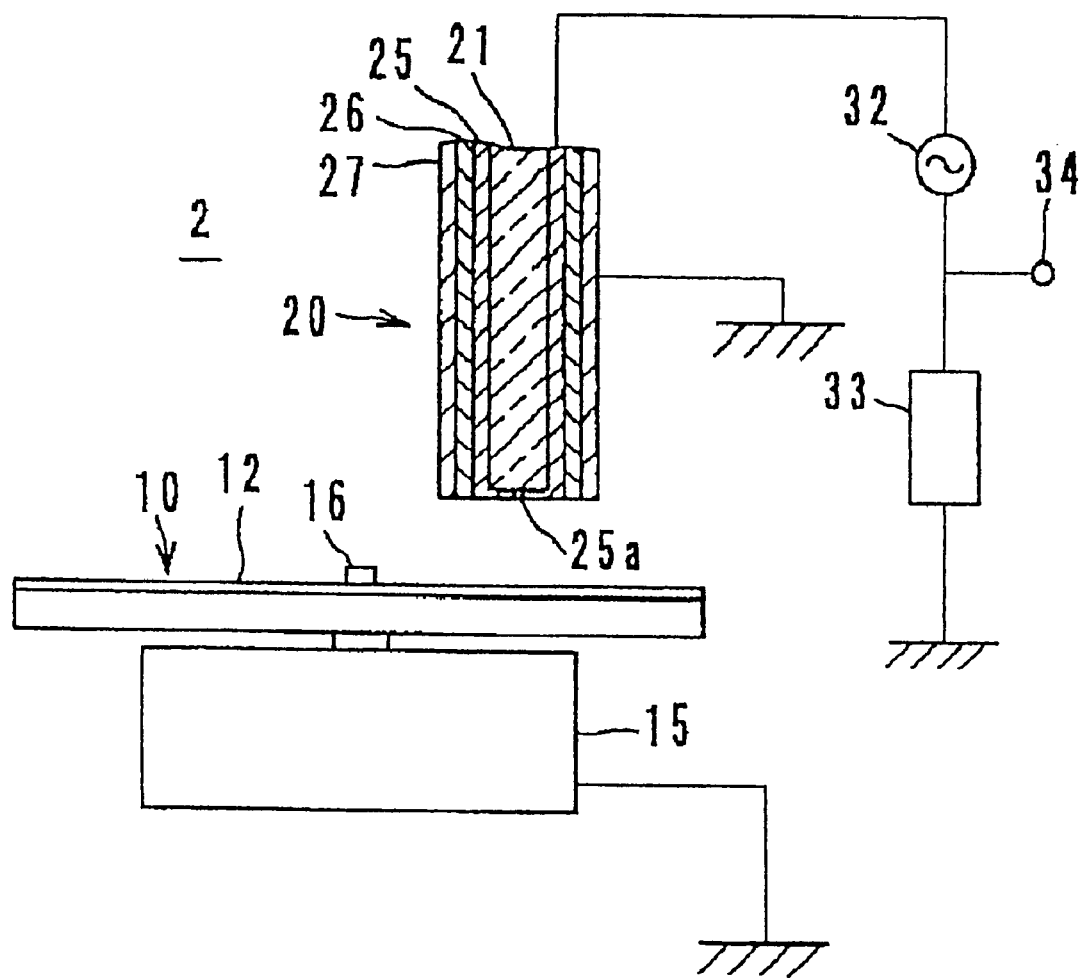
FIG. 5 briefly shows the construction of a second embodiment of the present invention.

Second Embodiment (refer to FIG. 5)

In the recording or reading apparatus 2 shown in FIG. 5, the surface of the conductive layer 25 of the optical fiber probe 21 is covered by another conductive layer 27 through an insulation layer 26. The conductive layer 27 is grounded. In other aspects the construction is identical to that of the first embodiment shown in FIGS. 1 and 2; in FIG. 5, parts in common with FIG. 1 are designated by like reference numbers.

In the second embodiment, external electric noise and magnetic noise is shielded from the conductive layer 25 on the inner side because the conductive layer 27 on the outer side is grounded. For this reason, the S/N ratio is improved when detecting the electrostatic capacity between the conductive layers 25 and 12.

Figure 6:
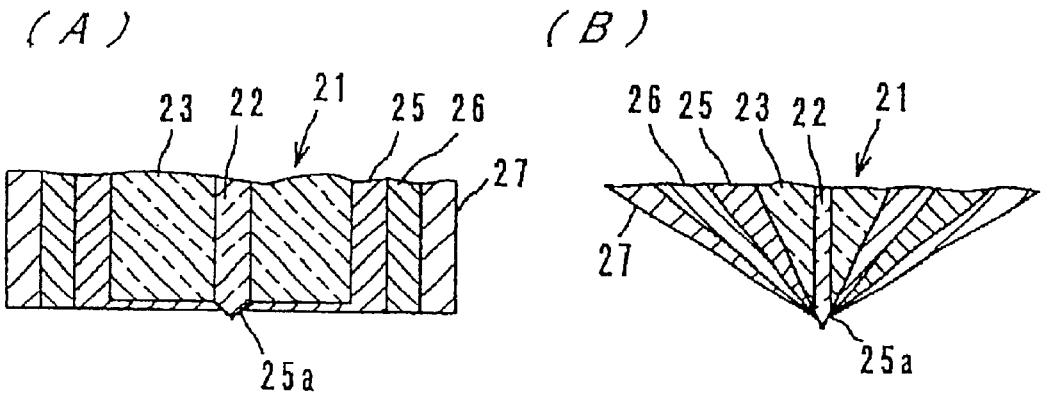
FIG. 6(A) is a cross section view of a first construction of an optical fiber probe tip area used in the second embodiment.
FIG. 6(B) is a cross section view of a second construction of an optical fiber probe tip area used in the second embodiment.

FIG. 6(A) shows an example of a tip shape of the probe 21 when the shield conductive layer 27 is provided, and FIG. 6(B) shows another example. These drawings correspond to FIGS. 3(A) and 3(B).

Figure 7:
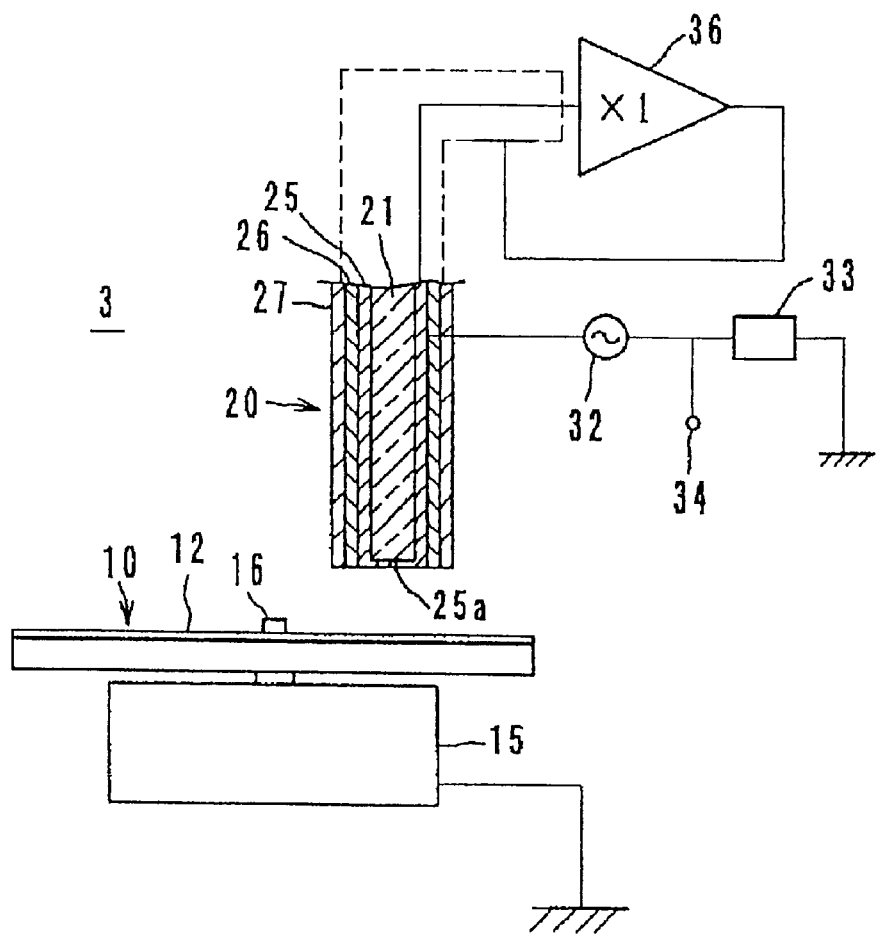
FIG. 7 briefly shows the construction of the third embodiment of the present invention.

Third Embodiment (refer to FIG. 7)

The recording or reading apparatus 3 shown in FIG. 7 maintains identical electric potential of the conductive layers 25 and 27, and is also capable of detecting small electrostatic capacity between the conductive layers 25 and 12. In this embodiment, feedback is controllable even when a relatively large gap is set between the probe 21 and the recording medium 10, i.e., when there is a small electrostatic capacity between the conductive layers 25 and 12.

When the shield conductive layer 27 is provided on the conductive layer 25 through an insulation layer 26, the electrostatic capacity generated between the conductive layers 25 and 27 adversely affects the detection value of the electrostatic capacity between the conductive layers 25 and 12. The detection target conductive layer 25 is connected to the input of an amplifier 36, and the output of the amplifier 36 is connected to the shield conductive layer 27.

That is, the potential of the conductive layer 25 is input to the amplifier 36 and subjected to impedance conversion, and the converted potential is input to the conductive layer 27. In this way even when there is an electrostatic capacity between the conductive layers 25 and 27, both conductive layers have identical potentials and current does not flow, such that the electrostatic capacity between the conductive layers 25 and 12 can be detected with high accuracy.

Other Embodiments

The near-field optical recording or reading apparatus of the present invention is not limited to the previously described embodiments, and may be variously modified insofar as such modifications are within the scope of the invention.

In particular, the drive means for supporting the gap need not be a Z-axis piezo element, inasmuch as another element capable of feedback control may be used.

The present invention is capable of maintaining a fixed gap between a probe and a recording medium via a simple construction by forming a conductive layer on the probe and the recording medium and detecting the electrostatic capacity therebetween. In particular, the disadvantages of requiring an oscillation means and a plurality of optical element, and the further disadvantage of widening the recording spot found in conventional share force methods are avoided.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A near-field optical recording apparatus comprising:
   an optical fiber probe for generating near-field light;
   a driver for supporting an optical head having the probe therein and maintaining a gap between a recording medium and the probe;
   a first conductive layer covering at least a tip portion of the probe;
   a second conductive layer provided on the recording medium;
   a detector for detecting electrostatic capacitance between the first layer and the second layer; and
   a controller for controlling the driver based on a detection result of the detector.

2. A near-field optical recording apparatus comprising:
   a driver for supporting an optical head having a probe therein and maintaining a gap between a recording medium and the probe;
   a first conductive layer covering at least a tip portion of the probe;
   a second conductive layer provided on the recording medium;
   a third conductive layer covering the first conductive layer through an insulation layer;
   a detector for detecting electrostatic capacitance between the first layer and the second layer; and
   a controller for controlling the driver based on a detection result of the detector.

3. A near-field optical recording apparatus according to claim 2, wherein said third conductive layer is grounded.

4. A near-field optical recording apparatus according to claim 2, wherein a signal of said first conductive layer is subjected to impedance conversion and the converted signal is input to said third conductive layer.

5. A near-field optical recording apparatus according to claim 1, wherein said tip portion of the probe is sharpened.

6. A near-field optical recording apparatus according to claim 5, wherein said tip portion of the probe has a small opening.

7. A near-field optical recording apparatus according to claim 1, wherein said second conductive layer is provided on a recording layer of said recording medium.

8. A near-field optical recording apparatus according to claim 1, wherein said second conductive layer is provided under a recording layer of said recording medium.

9. A near-field optical reading apparatus comprising:
   an optical fiber probe for generating near-field light;
   a driver for supporting an optical head having the probe therein and maintaining a gap between a recording medium and the probe;
   a first conductive layer covering at least a tip portion of the probe;
   a second conductive layer provided on the recording medium;
   a detector for detecting electrostatic capacitance between the first layer and the second layer; and
   a controller for controlling the driver based on a detection result of the detector.

10. A near-field optical reading apparatus comprising:
    a driver for supporting an optical head having a probe therein and maintaining a gap between a recording medium and the probe;
    a first conductive layer covering at least a tip portion of the probe;
    a second conductive layer provided on the recording medium;
    a third conductive layer covering the first conductive layer through an insulation layer;
    a detector for detecting electrostatic capacitance between the first layer and the second layer; and
    a controller for controlling the driver based on a detection result of the detector.

11. A near-field optical reading apparatus according to claim 10, wherein said third conductive layer is grounded.

12. A near-field optical reading apparatus according to claim 10, wherein a signal of said first conductive layer is subjected to impedance conversion and the converted signal is input to said third conductive layer.

13. A near-field optical reading apparatus according to claim 9, wherein said tip portion of the probe is sharpened.

14. A near-field optical reading apparatus according to claim 9, wherein said tip portion of the probe has a small opening.

15. A near-field optical reading apparatus according to claim 9, wherein said second conductive layer is provided on a recording layer of said recording medium.

16. A near-field optical reading apparatus according to claim 9, wherein said second conductive layer is provided under a recording layer of said recording medium.

* * * * *

UNITED STATES PATENT AND TRADEMARK OFFICE
CERTIFICATE OF CORRECTION

PATENT NO. : 6,438,092 B1
DATED : August 20, 2002
INVENTOR(S) : Takayuki Hoshino It is certified that error appears in the above-identified patent and that said Letters Patent is hereby corrected as shown below:

<u>Title page,</u>
Item [57] ABSTRACT,
Line 8, please change "filer probe" to -- fiber probe --.

Signed and Sealed this

Twenty-first Day of January, 2003

JAMES E. ROGAN
*Director of the United States Patent and Trademark Office*